United States Patent
Ben-Rubi (10) Patent No.: US 11,126,369 B1
(45) Date of Patent: Sep. 21, 2021

(54) DATA STORAGE WITH IMPROVED SUSPEND RESUME PERFORMANCE

(71) Applicant: Western Digital Technologies, Inc., San Jose, CA (US)

(72) Inventor: Refael Ben-Rubi, Rosh Haayin (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 14 days.

(21) Appl. No.: 16/805,570

(22) Filed: Feb. 28, 2020

(51) Int. Cl.
G06F 12/00 (2006.01)
G06F 3/06 (2006.01)
G06F 13/00 (2006.01)
G06F 13/28 (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,321,233 B1 | 11/2001 | Larson | |
| 7,047,374 B2 | 5/2006 | Sah et al. | |
| 8,098,525 B2 | 1/2012 | Horesh et al. | |
| 8,174,857 B1 | 5/2012 | Sommer et al. | |
| 8,787,057 B2 | 7/2014 | Gurgi et al. | |
| 9,158,623 B2 | 10/2015 | Nemazie et al. | |
| 9,262,268 B2 | 2/2016 | Cai et al. | |
| 9,564,234 B2 | 2/2017 | Kwak et al. | |
| 9,659,638 B1 * | 5/2017 | Shin | G11C 11/5642 |
| 9,792,995 B1 * | 10/2017 | Shah | G11C 16/26 |
| 9,799,406 B2 | 10/2017 | Sato et al. | |
| 9,830,992 B1 | 11/2017 | Tsai et al. | |
| 10,379,738 B2 | 8/2019 | Rajwade et al. | |
| 10,438,656 B2 * | 10/2019 | Madraswala | G11C 11/5642 |
| 2012/0198125 A1 * | 8/2012 | Post | G06F 12/0246 711/103 |
| 2014/0189218 A1 | 7/2014 | Cho et al. | |
| 2014/0229699 A1 | 8/2014 | Gurgi et al. | |
| 2014/0247655 A1 * | 9/2014 | Motwani | G06F 3/0608 365/185.03 |
| 2017/0365335 A1 * | 12/2017 | Wang | G11C 11/5628 |
| 2019/0179744 A1 | 6/2019 | Park | |
| 2019/0303236 A1 | 10/2019 | Ellis et al. | |
| 2021/0124499 A1 * | 4/2021 | Bert | G06F 3/0679 |

FOREIGN PATENT DOCUMENTS

| | | |
|---|---|---|
| KR | 20050066228 A | 6/2005 |
| KR | 20170101199 A | 9/2017 |

* cited by examiner

*Primary Examiner* — Mark A Giardino, Jr.
(74) *Attorney, Agent, or Firm* — Patterson & Sheridan, LLP; Steven H. Versteeg (57) ABSTRACT

The present disclosure generally relates to efficiently reading data during a suspend resume operation. Once writing is suspended, and prior to reading the data, a determination is made regarding whether there are multiple reads of the same page type. If there are multiple reads of the same page type, those reads are paired up so that the two reads of the same page type can occur from two planes in parallel. If two different pages types are read in parallel on the two planes, the slowest page type will determine the duration of the read. By grouping reads of the same page type and proceeding with the read, the disruption during suspend resume operations is minimized.

20 Claims, 4 Drawing Sheets

DATA STORAGE WITH IMPROVED SUSPEND RESUME PERFORMANCE

BACKGROUND OF THE DISCLOSURE

Field of the Disclosure

Embodiments of the present disclosure generally relate to efficient reading during a suspend resume operation.

Description of the Related Art

Storage devices, such as solid state devices (SSDs), have suspend resume operations where a programming (or write) operation is stopped. Once the writing has stopped, a read operation is performed. Data is transferred into a buffer at the end of the read operations, and then the write operations resume.

Recent advances in SSD has permitted asynchronous independent plane read (AIPR) where two sense operations can be performed in parallel in two different planes. When there is an AIPR read operation, pages in different pages are chosen arbitrarily. In triple level cell (TLC), there is a lower page, a middle page, and an upper page. For example, the lower page can be chosen for plane 0, the middle page may be chosen for plane 1. The effective busy time for the read will be determined by the slower page, which in this case is the middle page. The read performance is not optimal for the interrupted program performance.

One manner to improve read performance is to increase toggle mode frequency, this is actually the clock of the data transfer between controller and flash, but increasing toggle mode frequency involved using too much current. Alternatively, multiple dies in parallel can be activated, but the power consumption is a limitation. Furthermore, die size for activating multiple dies may also be a problem.

Therefore, there is a need in the art for an improved manner to optimize read performance during suspend resume operations.

SUMMARY OF THE DISCLOSURE

The present disclosure generally relates to efficiently reading data during a suspend resume operation. Once writing is suspended, and prior to reading the data, a determination is made regarding whether there are multiple reads of the same page type. If there are multiple reads of the same page type, those reads are paired up so that the two reads of the same page type can occur from two planes in parallel. If two different pages types are read in parallel on the two planes, the slowest page type will determine the duration of the read. By grouping reads of the same page type and proceeding with the read, the disruption during suspend resume operations is minimized. It is to be understood that the phrase "page type" encompasses page types such as SLC/MLC/TLC/QLC as well as page number, inside one word line (e.g., each word line in TLC contains 3 pages)

In one embodiment, a data storage device comprises: a memory device, wherein the memory device is a MLC device; and a controller coupled to the memory device. The controller is configured to: determine to execute multiple read commands; determine whether the any of the multiple read commands are of the same page type; group two reads of the same page type into a pair; and execute the two reads of the same page type of the pair in parallel on two planes.

In another embodiment, a data storage device comprises: a memory device; and a controller coupled to the memory device. The controller is configured to: suspend write operations; determine whether any scheduled read commands of are of the same page type; search a read queue to determine if any queued read commands are of the same page type as the scheduled read commands; pair up read commands of the same page type; and execute read commands of the same page type in parallel on two separate planes.

In another embodiment, a data storage device, comprises: a memory device; and a controller coupled to the memory device. The controller is configured to: suspend write operations; determine that two scheduled read commands of a plurality of scheduled read commands have a same number of read thresholds; pair up read commands with the same number of read thresholds; and execute read commands of the same read threshold in parallel on two separate planes.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to efficiently reading data during a suspend resume operation. Once writing is suspended, and prior to reading the data, a determination is made regarding whether there are multiple reads of the same page type. If there are multiple reads of the same page type, those reads are paired up so that the two reads of the same page type can occur from two planes in parallel. If two different pages types are read in parallel on the two planes, the slowest page type will determine the duration of the read. By grouping reads of the same page type and proceeding with the read, the disruption during suspend resume operations is minimized.

Figure 1:
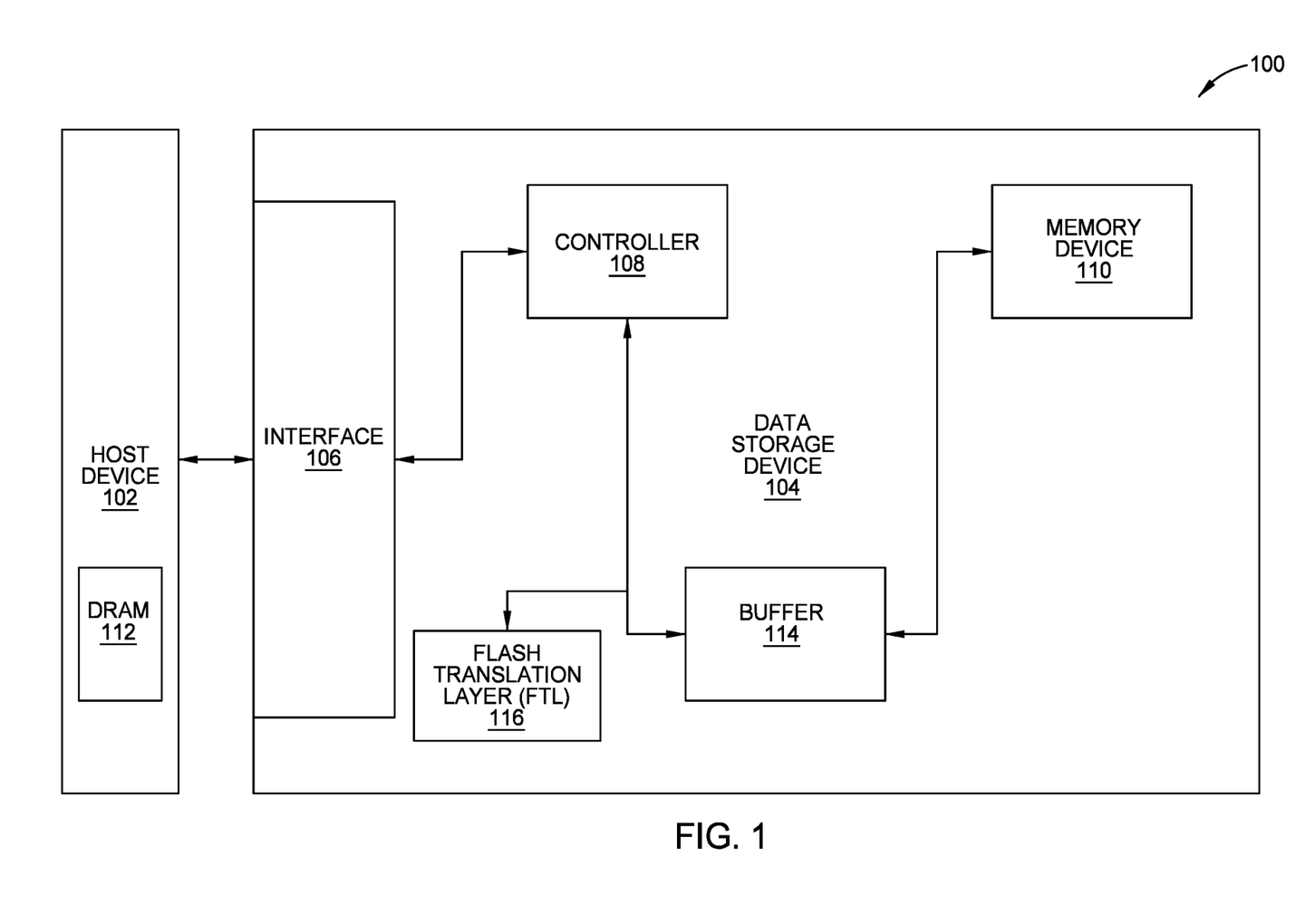
FIG. 1 is a schematic illustration of a system for storing data.

FIG. 1 is a schematic illustration of a system 100 for storing data. The system 100 for storing data according to one embodiment includes a host device 102 and a data storage device 104. The host device 102 includes a dynamic random-access memory (DRAM) 112. The host device 102 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host device 102 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

The data storage device 104 communicates with the host device 102 through an interface 106 included in the data storage device 104. The data storage device 104 includes a controller 108, a buffer 114, a flash translation layer (FTL) 116, and one or more memory devices 110. The data storage device 104 may be an internal storage drive, such as a notebook hard drive or a desktop hard drive. Data storage device 104 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Data storage device 104 may take the form of an embedded mass storage device, such as an eSD/eMMC embedded flash drive, embedded in host device 102. Data storage device 104 may also be any other type of internal storage device, removable storage device, embedded storage device, external storage device, or network storage device.

Memory device 110 may be, but is not limited to, internal or external storage units. The memory device 110 relies on a semiconductor memory chip, in which data can be stored as random-access memory (RAM), read-only memory (ROM), or other forms for RAM and ROM. RAM is utilized for temporary storage of data whereas ROM is utilized for storing data permanently.

Data storage device 104 includes a controller 108 which manages operations of data storage device 104, such as writes to or reads from memory device 110. The controller 108 executes computer-readable program code (e.g., software or firmware) executable commands or instructions (herein referred to as "instructions") for the transfer of data. The instructions may be executed by various components of controller 108 such as processor, logic gates, switches, applications specific integrated circuits (ASICs), programmable logic controllers embedded microcontrollers, and other components of controller 108.

Data storage device 104 includes a buffer 114 which is a region of physical memory storage used to temporarily store data while it is being moved from one place to another (i.e., from host device 102 to data storage device 104).

Data storage device 104 includes a flash translation layer (FTL) 116 which is a hardware/software layer coupled with the controller 108. In some embodiments, the FTL may track logical-to-physical address translation, garbage collection, wear-leveling, error correction code (ECC), bad block management, and other functions not listed. The logical-to-physical address translation relates to the mapping of logical addresses from the file system to physical addresses of the memory device 110, such as NAND flash memory.

Data may be transferred to or from the DRAM 112 of the host device 102 to the data storage device 104. One data transfer pathway may originate from the DRAM 112 of the host device 102 and communicate through the interface 106 of the data storage device 104 to the controller 108. The data will then pass through the buffer 114 of the data storage device 104 and be stored in the memory device 110. The controller is configured to update the FTL translation table of the data locations of the within a memory device 110.

Figure 2:
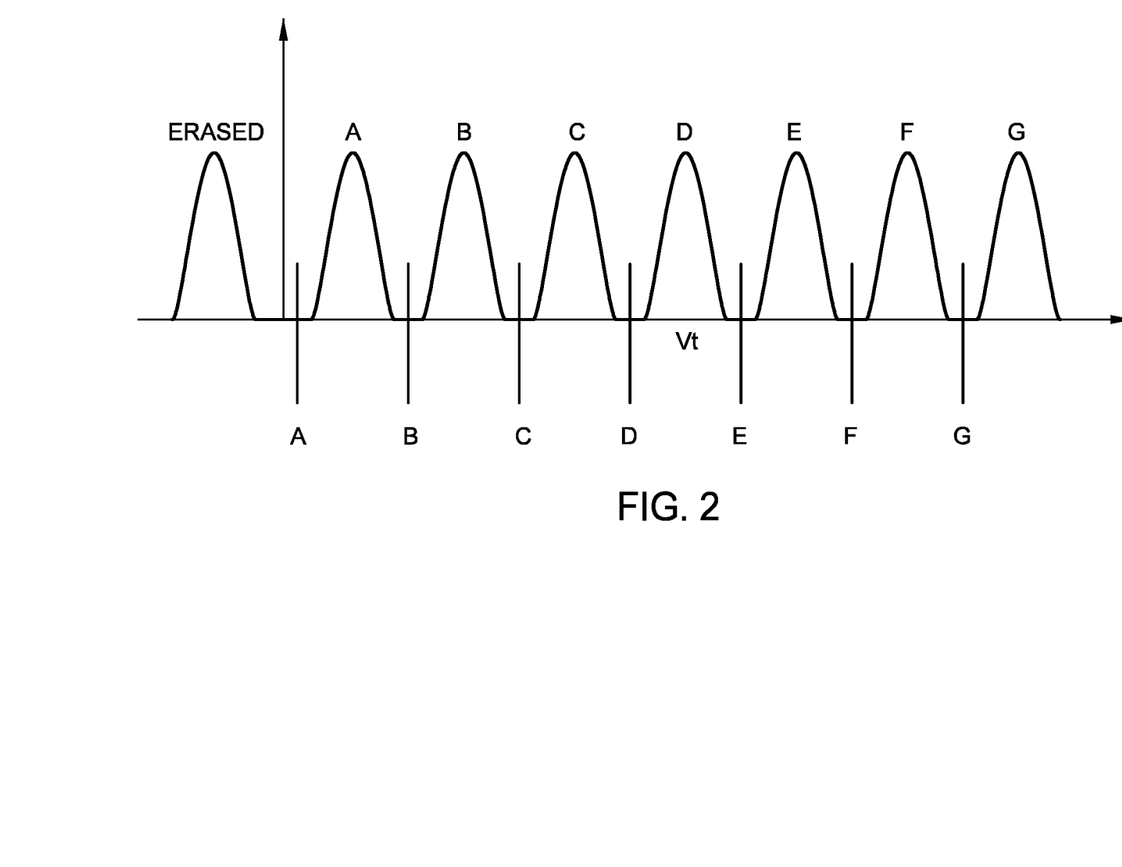
FIG. 2 is a schematic illustration of the 8 voltage levels for read operation for TLC memory.

FIG. 2 is a schematic illustration of the 8 voltage levels for read operation for TLC memory. TLC memory is composed of 3 bits in which either a program state of 0 or 1 can exist. The program state refers to the state of the memory cell, whether the memory cell is empty (i.e., no data exists) or the memory cell is programmed (i.e., data exists). Furthermore, the number of unique combinations of program states can be solved in the following equation: (Total number of voltage levels)=2^(number of bits per memory cell). For the TLC memory, the number of voltage levels is eight because 2^3=8.

As the number of bits increases, the memory cell can record more information leading to larger data storage. Furthermore, the equation for unique combination of program states may be applied to SLC memory, TLC memory, QLC memory, penta-layer cell (PLC) memory, and other higher iterations of layer cell memory.

The program state of 0 refers to a programmed state whereas the program state of 1 refers to an erased state. The TLC memory has 8 voltage levels, where one is erased and seven are programmed. Furthermore, the one voltage level that is erased has a bit combination of 111. For any memory cell, if the bit combination only contains the program state 1, then the program state is erased (e.g., 1 for SLC, 11 for MLC, and 1111 for QLC). Listing from lowest threshold voltage, denoted by Vt on the x-axis, to highest threshold voltage in FIG. 2, the voltage levels are 111 for the erased cell state, 110 for cell state A, 100 for cell state B, 000 for cell state C, 010 for cell state D, 011 for cell state E, 001 for cell state F, and 101 for cell state G.

The bits for the cell state (i.e., ###) are upper page, middle page, lower page. Furthermore, the lines between the curves are labeled A, B, C, D, E, F, and G are related to the threshold or reference voltage. For other memory cells, the number of threshold or reference voltages can be solved by the following equation: (number of threshold or reference voltages)=(total number of voltage levels)−1. The individual pages of data can be read by performing a number of comparisons at threshold points, determining whether the cell voltage is lower or higher than the threshold. The number of comparisons required for each page read depends upon the bit encoding employed. In FIG. 2, the programmed states are represented by the probability-distribution 'bumps' at the top and the threshold voltage positions listed at the bottom (i.e., A-G with the vertical lines). Various encoding schemes are possible, but currently, a 2-3-2 scheme is used as shown in the Table.

TABLE

| Cell State | Erase | A | B | C | D | E | F | G |
|---|---|---|---|---|---|---|---|---|
| Upper page read | 1 | 1 | 1 | 0 | 0 | 0 | 0 | 1 |
| Middle page read | 1 | 1 | 0 | 0 | 1 | 1 | 0 | 0 |
| Lower page read | 1 | 0 | 0 | 0 | 0 | 1 | 1 | 1 |

The bit represented on the lower page can be determined by executing two comparisons against the voltage stored in the cell. If the voltage is above threshold A, and below threshold E, then the bit represents a "0", otherwise the bit represents a "1". Hence, the lower page is a 2 of the 2-3-2 scheme.

The bit represented on the middle page can be determined by executing three comparisons, at thresholds B, D, and F. Hence, the middle page is a 3 of the 2-3-2 scheme.

The bit represented on the upper page can be determined by executing two comparisons against the voltage stored in the cell. If the voltage is above threshold C and below thresholds G, then the bit represents a "0", otherwise the bit represents a "1". Hence, the upper page is a 2 of the 2-3-2 scheme.

To read the value stored by a bit in the memory cell, the corresponding word line is activated, which allows energy stored in the capacitor to flow onto the bit line. When word line is activated and the capacitor has sufficient stored energy, the voltage present on the bit line will correspond to a 1. Otherwise, if the capacitor does not have a sufficient quantity of stored energy, the program state of the bit line will be interpreted as a 0.

When firmware encounters a program operation that is interrupted by read access to one plane, and there is at least one pending read request that is located in a queue on the other planes, the firmware will try to read pages from two planes in parallel and not serially. In the process of choosing read operations for the other plane, the firmware will take into account the page type (e.g., lower, middle or upper) that is the same as the page type of the requested read operation. In so doing, the read performance will be improved.

Figure 3:
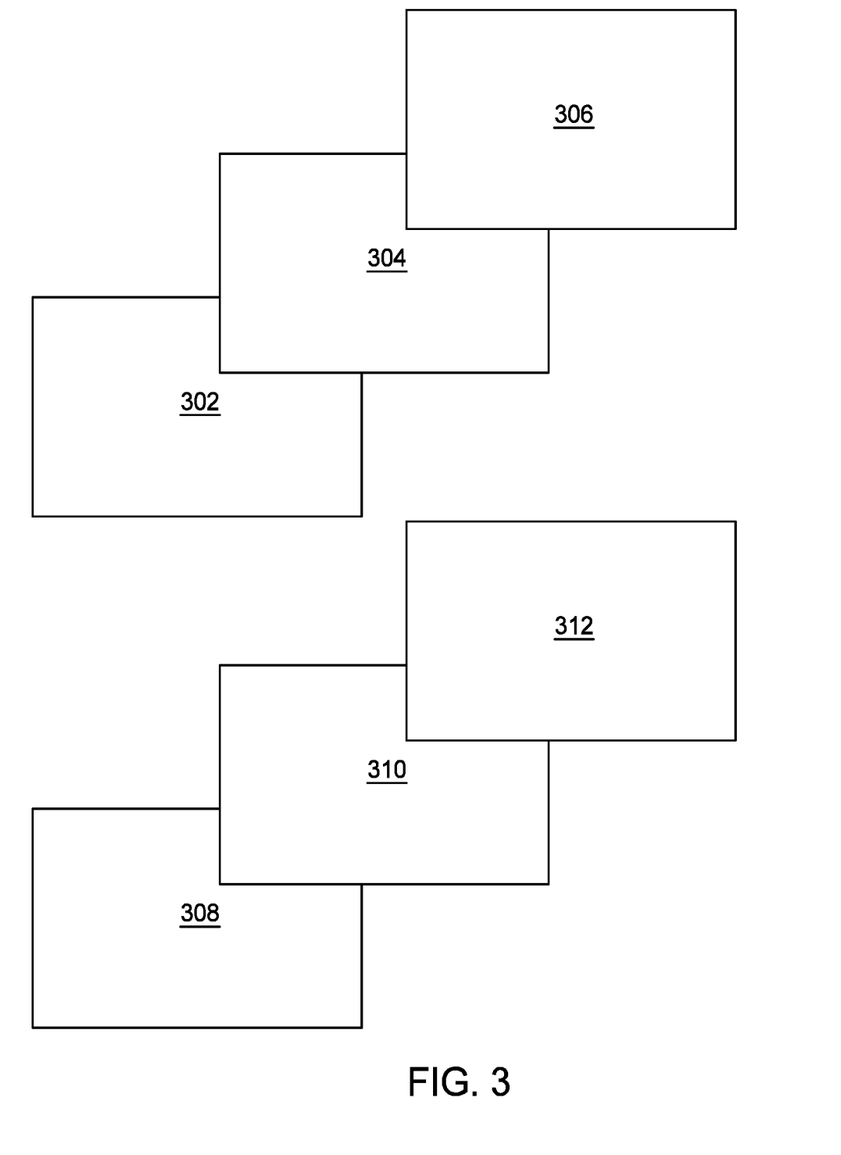
FIG. 3 is a schematic illustration of 2 parallel planes, each with multiple pages, according to one embodiment.

FIG. 3 is a schematic illustration of two parallel planes, each with multiple pages, according to one embodiment. References to FIG. 2 will be utilized to aid the explanation of the possible embodiment of the parallel planes, each with multiple pages. The first plane is composed of three pages, such as lower page 302, middle page 304, and upper page 306. The second plane is composed of three pages, such as lower page 308, middle page 310, and upper page 312. The denotation of first and second is arbitrary and may be used to describe the other plane other than itself. Furthermore, other embodiments may include more or less planes, and each plane may include more or less pages. The lower pages 302, 308 are parallel to one another for read purposes, the middle pages 304, 310 are parallel to one another for read purposes, and the upper pages 306, 312 are parallel to one another for read purposes.

Each level of the plane may have a different number of senses that must be recognized from the sense amplifier to determine the bit value of the page. The sense amplifier senses low power signals from a bit line and amplifies the voltage to a recognizable logic level. The recognizable logic level allows the device to interpret the data.

For example, in one embodiment, for a 3 page system, the upper page may require 2 senses, the middle page may require 3 senses, and the lower page may require 2 senses. Each sense may take up to, but neither limited by a time value nor restricted by a time value, a value of about 12.5 µs, a value of about 25 µs, a value of about 27 µs, a value of about 70 µs, and a value of about 80 µs. The time values referenced are possible time values for the time it may take for a sense to occur and is in no way limiting nor restricting. A sense may occur on each plane. Therefore, two senses will occur at the same time, one on each plane.

Furthermore, in the case that the controller receives four read operations, in the order of lower page, middle page, lower page, and middle page, the total time for the read to normally occur will be based upon the order in which the read requests are received. For this example, since only two pages can undergo the sense operation simultaneously, the order of the operations are lower page and middle page together and then lower page and middle page together. If the lower page takes 2 sense operations and the middle page takes 3 sense operations to complete, the total sense operations for the four read requests is 6. The middle page sense operations are the limiting factor contributing to the 6 sense operations (i.e., 3 (middle page to lower page)+3 (middle page to lower page)=6 total sense operations).

However, if the controller matches the same pages to each other (i.e., lower page to lower page and middle page to middle page), the total number of sense operations is decreased to 5, resulting in increased read performance and decreasing the time between writing operations. The total number of sense operations is calculated as follows: 2 (lower page to lower page)+3 (middle page to middle page)=5 total sense operations.

Furthermore if a sense occurs on the lower page of a plane and a sense occurs on the middle page of another plane, the total read time will be bounded by the larger of the two sense times. For example, if the sense of the lower page takes about 25 µs and the sense of the middle page takes about 30 µs, the total read time will be that of the limiting factor, the middle page, about 30 µs. The previous numeric time values are an example and not to be taken as limiting nor restricting. Generally, even if pages on different levels have the same number of senses occurring, the senses of the lower page will complete quicker than the senses of the other pages. In order to optimize the read process, pages with similar senses should be matched together to have efficient utilization of time (i.e., both pages finish reading at the same time) during a suspend resume operation. Likewise, the embodiment described may be used for other higher iterations of memory cells besides TLC such as QLC and PLC. As the number of cells increase, the number of pages per plane increase (i.e., TLC has three cells with three pages and QLC has four cells with four pages). The overall efficiency gained by having one more page than the previous iteration may be greater than the efficiency gained by the three page system.

Consider another example where the page type requested to be read is a lower page, and the queue has four other read requests with the page types (in order): lower, upper, upper, and middle. The chosen "other" read request for the second plane will be the lower read request because if the middle page is read in parallel with the lower page, the lower sense time will be shorter than the middle page sense time. If the middle is selected, then the plane that reads the lower page will do nothing for a period of time that the middle page is still sensing. It would not be possible to simply read from the same plane as the lower page once the lower page sense is completed because further read operations cannot occur until both read planes are ready. Thus, the busy time for both planes is: MAX (busy time of the first plane, busy time of the second plane). That is why there is a preference to make the two planes busy time as equal as possible.

Consider another example where the requested page read is a middle page and the queue already has four other pages read requests (in order): lower, upper, upper, and middle. For the second plane to be read with the first plane middle read, the middle read that was in the queue is selected. If the lower page were to be read in parallel to the middle page, the lower sense time would be shorted than the middle page sense time such that the plane with the lower page read would do nothing while the plane with the middle page sense time was still sensing. The same concept may be applied to multiple planes and to more than 3 pages.

Figure 4:
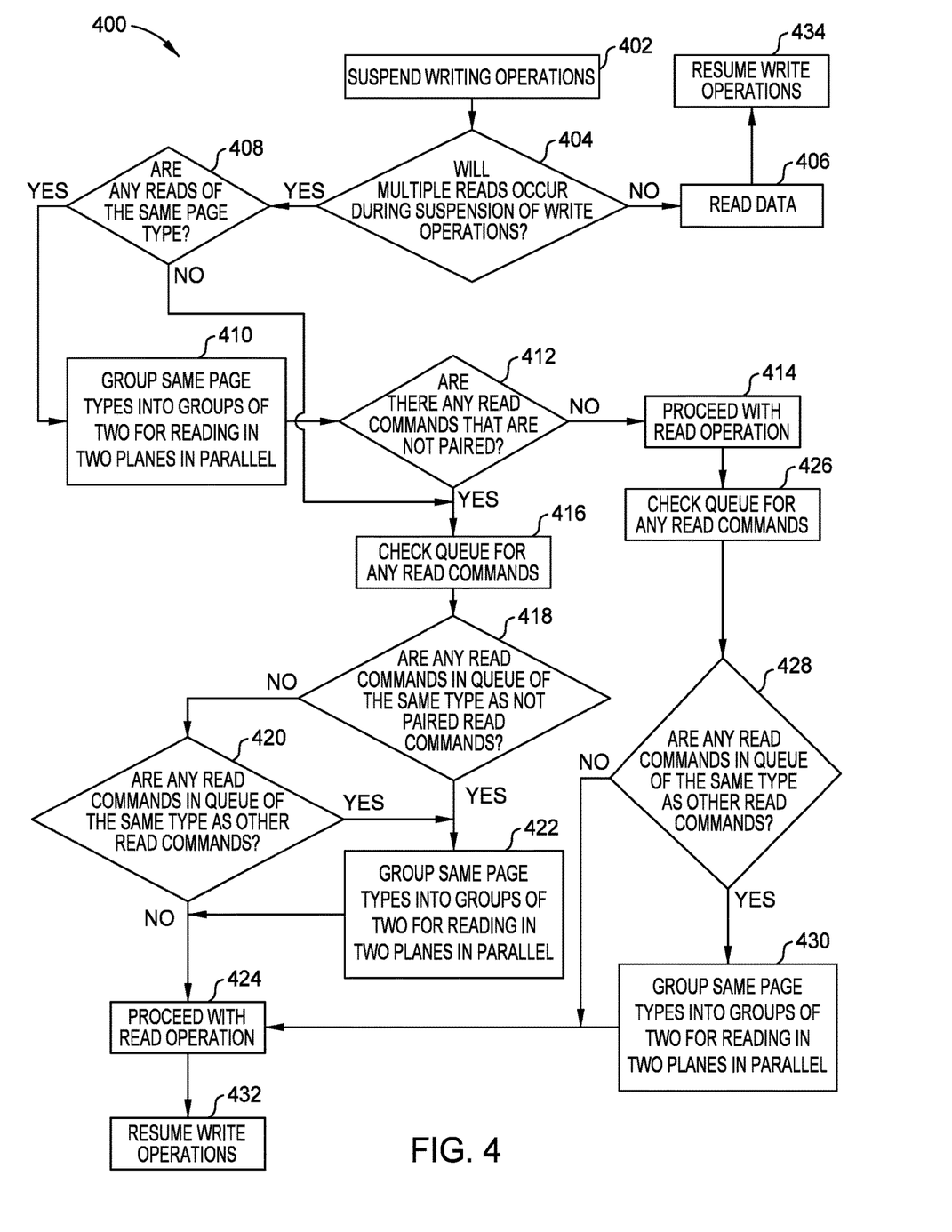
FIG. 4 is a flowchart illustrating efficiently reading data during a suspend resume operation according to one embodiment.

FIG. 4 is a flowchart 400 illustrating efficiently reading data during a suspend resume operation according to one embodiment. Throughout the data writing process, the storage device, such as the storage device 104 of FIG. 1, may suspend the current write to read the written data. Furthermore, multiple pages may be programmed concurrently. When a write is suspended, new read commands are queued so that the read commands may be completed sequentially. The write suspend may be initiated by a time value between read commands, a read command by the user, a data validation by the firmware, or other processes not listed.

The method 400 describes a logic path of the process of a suspend resume operation. At block 402, the device receives a read command that suspends the current write operation. The read command may be user initiated, firmware initiated by the need to validate data, firmware initiated by a predetermined amount of time between read commands, or other processes not listed. At block 404, the firmware will register the number of read commands initiated for the pages. If a single read command is queued, then the controller will read the data at block 406 and resume write operations after the read has completed at block 434.

However, if multiple reads are initiated for the pages at the time of the suspension of write operations, then the controller will register if any of the reads are of the same page type (e.g., lower page and lower page). If the multiple reads are not of the same page type, at block 416, the controller will check the queue for any additional read commands. Furthermore, at block 418, if the controller discovers unpaired read commands of the same type as the single read commands, then the read commands are paired into groups of two for reading in two planes in parallel at block 422. At block 424, the read operation is commenced. Following the read operation, the write operation resumes at block 432.

However, at block 418, if the read commands are not the same as other paired read commands, then the controller will determine if the read commands are the same as other read commands in the queue at block 420. The controller will group the same page types into groups of two for reading in two planes in parallel at block 422. Consequently, the read operation will commence at block 424 and the write operation will resume afterwards at block 432.

If there are no other non-paired read commands with the same read type at block 420, then the read operation will proceed with the paired read commands and the non-paired read commands at block 424. Afterwards, the write operations will resume at block 432. To help illustrate the process going forward, the process described from block 416 to block 424 will be denoted as "Check Queue 1" which includes the flow path from blocks 416 to 418 to 422 to 424, blocks 416 to 418 to 420 to 422 to 424, and blocks 416 to 418 to 420 to 424.

At block 408, if there are multiple reads of the same page type, then the same page types are grouped into groups of two for reading in two planes in parallel at block 410. The controller will then determine if there are any read commands not paired in the planes at block 412. If there are any read commands not paired at block 412, then the process denoted as "Check Queue 1" will occur.

However, if all the read commands from the two planes are paired, then the read operation will commence at block 414. Subsequently, the controller will check the queue for any additional read commands at block 426. At block 428, the controller determines if any read commands in the queue are of the same type as the other read commands. If there are no other read commands as the same type, then at block 424, the read operation is commenced. The write operations are resumed afterwards at block 432.

If there are read commands in the queue that are of the same type as the other read commands at block 428, the same page type or read commands are grouped into groups of two for reading in two planes in parallel at block 430. The read operation will commence at block 424 and the write operation will resume afterwards at block 432. By grouping similar page types and read commands together, the overall read process time is optimized allowing for less interruption during the data write process. Furthermore, only the storage device knows the location of the where the data is stored within the plane (e.g., upper page, middle page, or lower page). In addition, the LBA locations are stored within a translation table so that the controller can determine which logic process to follow within method 400. The storage device may write more data from the host in the same time frame as that without the method 400.

Likewise, if the device receives the following order of read requests: lower page, middle page, upper page, middle page, and lower page, the write process will suspend and the controller will proceed with method 400 to determine the optimum read process. For this example, the two lower pages will be grouped together and the two middle pages will be grouped together. The controller will then proceed to search the read queue for any read command that matches the sense operations of the upper page and group the read command and the upper page read request together. The read for the groups of two for reading in two planes in parallel will occur and then the ungrouped, non-matched read operations will be read individually. The write process resumes after the reads are completed.

In one embodiment, a data storage device comprises: a memory device, wherein the memory device is a MLC device; and a controller coupled to the memory device. The controller is configured to: determine to execute multiple read commands; determine whether the any of the multiple read commands are of the same page type; group two reads of the same page type into a pair; and execute the two reads of the same page type of the pair in parallel on two planes. The memory device is TLC memory. The controller is further configured to check a read queue to determine if there are any read commands of the same page type as the multiple reads. The controller is further configured to group a first read command of the multiple read commands with a second read command from the queue. The controller is configured to suspend write operations prior to determining to execute the multiple read commands. The controller is configured to resume write operations after executing the two reads of the same page type of the pair. The controller is further configured to create pairs of read commands of the same page type, wherein at least one read command is from a queue.

In another embodiment, a data storage device comprises: a memory device; and a controller coupled to the memory device. The controller is configured to: suspend write operations; determine whether any scheduled read commands of are of the same page type; search a read queue to determine if any queued read commands are of the same page type as the scheduled read commands; pair up read commands of the same page type; and execute read commands of the same page type in parallel on two separate planes. The scheduled read commands include a plurality of scheduled read commands, wherein the scheduled read commands includes a first scheduled read command of a first page type, a second scheduled read command of a second page type different from the first page type, a third scheduled read command of the first page type, and a fourth scheduled read command of the second page type. The first scheduled read command, the second scheduled read command, the third scheduled read command, and the fourth scheduled read command are organized in order from first to fourth. The third scheduled read command is paired with the first scheduled read command and wherein the fourth scheduled read command is paired with the second scheduled read command. The first page type can be read by executing a first predetermined number of comparisons against voltage stored in the memory device, wherein the second page type can be read by executing a second predetermined number of comparisons against voltage stored in the memory device, and wherein the first predetermined number is less than the second predetermined number. The controller is further configured to resume write operations after executing the read commands. Pairing up read commands of the same page type involves pairing up a scheduled read command with a queued read command.

In another embodiment, a data storage device, comprises: a memory device; and a controller coupled to the memory device. The controller is configured to: suspend write operations; determine that two scheduled read commands of a plurality of scheduled read commands have a same number of read thresholds; pair up read commands with the same number of read thresholds; and execute read commands of the same read threshold in parallel on two separate planes. The controller is further configured to determine that at least one scheduled read command has a different number of read thresholds than another scheduled read command. The plurality of read commands includes, in order, a first scheduled read command having a first read threshold, a second scheduled read command having a second read threshold, and a third scheduled read command having the first read threshold. The controller is configured to pair the first scheduled read command with the third scheduled read command. The controller is configured to check a read queue to determine whether any read commands in the read queue have the same number of thresholds as any scheduled read commands that are not paired. The controller is configured to check firmware of the data storage device to determine whether the firmware has any read commands to be executed that have the same number of thresholds as any scheduled read commands that are not paired.

By grouping reads of the same page type together, more efficient reads can occur, which will increase read performance and decrease interruption duration during the program operation.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device, wherein the memory device is a MLC device; and
a controller coupled to the memory device, the controller configured to:
determine to execute multiple read commands;
determine whether any of the multiple read commands are of the same sense time;
group two reads of the same sense time into a pair; and
execute the two reads of the same sense time of the pair in parallel on two planes.

2. The data storage device of claim 1, wherein the memory device is TLC memory.

3. The data storage device of claim 1, wherein the controller is further configured to check a read queue to determine if there are any read commands of the same sense time as the multiple reads.

4. The data storage device of claim 3, wherein the controller is further configured to group a first read command of the multiple read commands with a second read command from the queue.

5. The data storage device of claim 1, wherein the controller is configured to suspend write operations prior to determining to execute the multiple read commands.

6. The data storage device of claim 5, wherein the controller is configured to resume write operations after executing the two reads of the same sense time of the pair.

7. The data storage device of claim 1, wherein the controller is further configured to create pairs of read commands of the same sense time, wherein at least one read command is from a queue.

8. A data storage device, comprising:
a memory device; and
a controller coupled to the memory device, the controller is configured to:
suspend write operations;
determine whether any scheduled read commands of are of the same page type;
search a read queue to determine if any queued read commands are of the same page type as the scheduled read commands;
pair up read commands of the same page type; and
execute read commands of the same page type in parallel on two separate planes.

9. The data storage device of claim 8, wherein the scheduled read commands include a plurality of scheduled read commands, wherein the scheduled read commands includes a first scheduled read command of a first page type, a second scheduled read command of a second page type different from the first page type, a third scheduled read command of the first page type, and a fourth scheduled read command of the second page type.

10. The data storage device of claim 9, wherein the first scheduled read command, the second scheduled read command, the third scheduled read command, and the fourth scheduled read command are organized in order from first to fourth.

11. The data storage device of claim 10, wherein the third scheduled read command is paired with the first scheduled read command and wherein the fourth scheduled read command is paired with the second scheduled read command.

12. The data storage device of claim 11, wherein the first page type can be read by executing a first predetermined number of comparisons against voltage stored in the memory device, wherein the second page type can be read by executing a second predetermined number of comparisons against voltage stored in the memory device, and wherein the first predetermined number is less than the second predetermined number.

13. The data storage device of claim 8, wherein the controller is further configured to resume write operations after executing the read commands.

14. The data storage device of claim 8, wherein pairing up read commands of the same page type involves pairing up a scheduled read command with a queued read command.

15. A data storage device, comprising:
   a memory device; and
   a controller coupled to the memory device, the controller is configured to:
      suspend write operations;
      determine that two scheduled read commands of a plurality of scheduled read commands have a same number of read thresholds;
      pair up read commands with the same number of read thresholds; and
      execute read commands of the same read threshold in parallel on two separate planes.

16. The data storage device of claim 15, wherein the controller is further configured to determine that at least one scheduled read command has a different number of read thresholds than another scheduled read command.

17. The data storage device of claim 15, wherein the plurality of read commands includes, in order, a first scheduled read command having a first read threshold, a second scheduled read command having a second read threshold, and a third scheduled read command having the first read threshold.

18. The data storage device of claim 17, wherein the controller is configured to pair the first scheduled read command with the third scheduled read command.

19. The data storage device of claim 15, wherein the controller is configured to check a read queue to determine whether any read commands in the read queue have the same number of thresholds as any scheduled read commands that are not paired.

20. The data storage device of claim 19, wherein the controller is configured to check firmware of the data storage device to determine whether the firmware has any read commands to be executed that have the same number of thresholds as any scheduled read commands that are not paired.

* * * * *